United States Patent [19]

Middleton

[11] Patent Number: 5,173,346

[45] Date of Patent: Dec. 22, 1992

[54] FOLDABLE SPONGE MAT FOR SURGICAL APPLICATIONS

[76] Inventor: Breck Middleton, 611 South Tuxedo Ave., Stockton, Calif. 95204

[21] Appl. No.: 540,576

[22] Filed: Jun. 18, 1990

[51] Int. Cl.$^5$ ............................................. B32B 3/00
[52] U.S. Cl. ......................................... 428/53; 5/420; 114/229; 428/54; 428/158; 428/156; 428/319.9; 428/50; 428/47; 428/136; 4/582; 4/581
[58] Field of Search ................ 4/581; 5/420; 114/229; 428/53, 54, 158, 156, 319.9, 50, 47, 136

[56] References Cited

U.S. PATENT DOCUMENTS

| | | | |
|---|---|---|---|
| 2,057,162 | 10/1936 | Richey | 428/77 |
| 2,503,174 | 4/1950 | Salvadore | 4/581 |
| 2,671,743 | 3/1954 | Lindquist | 428/158 |

FOREIGN PATENT DOCUMENTS 1386677 3/1975 United Kingdom ............. 428/319.9

Primary Examiner—Patrick J. Ryan
Assistant Examiner—Kam F. Lee
Attorney, Agent, or Firm—Cislo & Thomas

[57] ABSTRACT

A surgical floor mat having a plurality of compressed sponge sections with a low profile in a dry condition and a expanded profile in a wet condition for absorbing fluids which fall onto the sponge sections over the course of a surgical procedure. Furthermore, the compressed sponge sections are adhered to a waterproof and foldable sheet with a gap between each of the sponge sections to allow the foldable sheet and sponge sections to be easily folded for purposes of storage or later disposal. The waterproof and foldable sheet has a non-slip undersurface for secure engagement between the operating room floor and the surgical floor mat. Additionally, an adhesive strip can be used and affixed to the undersurface of the foldable sheet for greater securement to the floor and a number of different configurations for the surgical floor mat can be used.

13 Claims, 2 Drawing Sheets

FOLDABLE SPONGE MAT FOR SURGICAL APPLICATIONS

BACKGROUND OF THE INVENTION

This invention relates generally to floor mats, and more particularly, to floor mats which can be used in surgical applications for the absorption of bodily fluids resulting therefrom over the course of surgery which must be sanitarily contained and later removed from the operating area.

There are a substantial number of different types of mats, disposable floor pads and handkerchiefs for wiping up, cleaning up, and even catching various fluids which may fall upon the floor.

A search directed to classifications 4/581, 5/420, 52,660, 114/229, 428/54, 78, 82, 152, 156, and 319.9 would uncover a number of different types of floor mats, even some foldable mats:

| Patent No. | Inventor | Issue Date |
| --- | --- | --- |
| 4,868,940 | R. Masadi | Sept. 26, 1989 |
| 4,328,275 | L. M. Vargo | May 4, 1982 |
| 4,278,719 | M. A. Sarnecki | July 14, 1981 |
| 3,512,529 | M. Nimoy | May 19, 1970 |
| 2,897,108 | K. J. Harwood | July 28, 1959 |
| 2,503,174 | J. Salvadore | April 4, 1950 |
| 2,282,672 | V. Nelson | May 12, 1942 |
| 2,251,372 | D. A. Nicholson | Aug. 5, 1941 |
| 2,140,902 | E. M. Fischer | Dec. 20, 1938 |
| 2,057,162 | J. A. Richey | Oct. 13, 1936 |
| 984,765 | B. D. Knickerbocker | Feb. 21, 1911 |

The more pertinent patents listed above are discussed in greater detail below:

Harwood U.S. Pat. No. 2,897,108 This patent is directed to a disposable absorbent pad or handkerchief. The pad is comprised of two absorbent layers made from porous webs of cellulose fibers and a moisture impervious backing made from suitable plastic such as polyethylene, polyvingl alcohol, or the like. However, the absorbent layers are not sectionalized and the plastic backing does not have a nonskid surface.

Vargo U.S. Pat. No. 4,328,275 This patent is directed to a disposable floor mat. The mat is comprised of a corrugated top layer made from a mixture of cellulose fibers and dialdehyde starch, two absorbent layers made from an acrylamide starch and a cellulosic fibrous material, respectively, and a liquid impervious bottom layer made from a polyethylene or polyester film. It should be noted that the top layer is coated in part with a liquid repellent and the first absorbent layer is impregnated with a sanitizing agent such as chlorophenol.

Nelson U.S. Pat. No. 2,282,672 This patent is directed to a sanitary doormat. The mat is comprised of an elongated rectangular receptacle made from metal or another liquid impervious material, an absorbent pad made from a fibrous material, and a germicidal liquid. The absorbent pad fits into the shallow opening of the receptacle. The liquid germicide is contained in the receptacle sufficient in volume to keep the pad moist and chemically effective. The absorbent pad is not removable from the receptacle.

Salvadore U.S. Pat. No. 2,503,174 This patent is directed to an absorbent bathroom mat. The mat is comprised of a metal or plastic watertight receptacle for holding a removable absorbent pad made from a sponge-like substance such as sponge rubber, and rubber nonskid feet or suction cups. The weight of anyone standing on the absorbent pad forces the liquid from the pad into the receptacle. The receptacle can then be emptied and the absorbent pad replaced.

Fischer U.S. Pat. No. 2,140,902 This patent is directed to an absorbent bathroom mat. The mat is comprised of an absorbent layer made from sponge or a similar material and a thin rubber or liquid impervious apron. The apron is attached to the absorbent pad by snap fasteners and is designed to lie over the side of a bath tub. The mat does not comprise a liquid impervious floor-facing layer and the absorbent pad is not sectionalized for folding. The liquid impervious apron disclosed merely serves as a means to keep the mat adjacent to the side of the bath tub.

The other patents are directed to other absorbent devices.

Still there are some types of mats which are made of treated polypropylene fiber which absorbs a great deal of fluid relative to its weight. These mats are flexible and are used primarily for absorbing excess floor fluids.

It is highly desirable to have a surgical floor mat which can be easily stored, is quickly positioned on the floor, retains fluids resulting from surgery, and can be easily discarded in a compact manner. Furthermore, the mat should not leak upon the floor and create an infection or a safety hazard over the course of its use. The mat should be highly absorbent and have an undersurface which will prevent slippage of the mat in a dry or wet condition. The mat should have an ability to retain a substantial amount of fluid prior to its disposal. The mat could also comprise biodegradable materials which can be readily discarded in a safe manner. Also, the mat should be foldable and come in a variety of sizes to accommodate a variety of surgical conditions or surgical applications. The mat should also be safe to use and not present an obstacle to walking.

There is great interest in the health care area to have such a surgical mat that incorporates all the features and benefits described above.

The features identified above as being desired for surgical mats are all provided by the present invention.

SUMMARY OF THE INVENTION

The present invention is embodied in an improved surgical mat comprised of a plurality of compressed sponge sections having a low profile under dry conditions and an expanded profile in a wet condition for removing fluids which fall onto the floor during surgical procedures. A waterproof and foldable sheet is incorporated having a first surface dimension to hold the sponge sections. The sponge sections are adhered to the foldable sheet in a side-by-side relationship allowing the sponge sections to fold on top of each other in a folded condition. A gap or space between each of the sponge sections allows for foldability. The gap or space allow the foldable sheet to act as a hinge, thereby allowing the compressed sponge sections to fold onto each other for compact storage and transportation.

The surgical floor mat can be kept in a folded condition prior to surgical use or in hospital storage. The surgical floor mat can then be unfolded and placed on the floor in a safe condition, especially since it has such a low profile. The foldable sheet of the surgical floor mat has a non-slip undersurface which allows secure engagement between a floor and the surgical floor mat. Additionally, adhesive strips can be incorporated for a more secure attachment between the floor and the surgical floor mat.

After the surgical procedure and after the surgical floor mat has absorbed any bodily fluid which may have fallen, it is folded so as to prevent the fluids from easily leaking onto the floor. The waterproof and foldable sheet prevents moisture from migrating through the compressed sponge sections onto the floor.

Each compressed sponge section comprises compressed cellulose, cloth fiber and salt materials of approximately 1 to 2 millimeters in thickness in a dry condition and having a 15 to 25 millimeter profile in a wet condition.

Furthermore, the waterproof and foldable sheet's non-skid undersurface may include stippling. The waterproof and foldable sheet extends up around the edges of the compressed sponge sections forming a ⅜ inch overlapping edge which can be glued or adhered to the sponge sections by stitching, glue or the like.

Each of the compressed sponge sections may be interrupted by gaps or canals of approximately 2 to 4 millimeters in thickness to allow for greater foldability and increase fluid migration to all portions of the compressed sponge sections.

Glue may be used between the compressed sponge sections and the waterproof and foldable sheet to ensure proper adhesion. The glue also has a tendency to seal any leaks caused by stitching.

The surgical floor mat can come in a rectilinear shape, a round shape with a deleted quartile portion and an L-shape, as well as a number of other shapes for different surgical applications.

Other aspects and advantages of the present invention will become apparent from the following description of the preferred embodiments, taken in conjunction with the accompanying drawings, which illustrate, by way of example, the principles of the invention.

DESCRIPTION OF THE PREFERRED EMBODIMENTS

Figure 1:
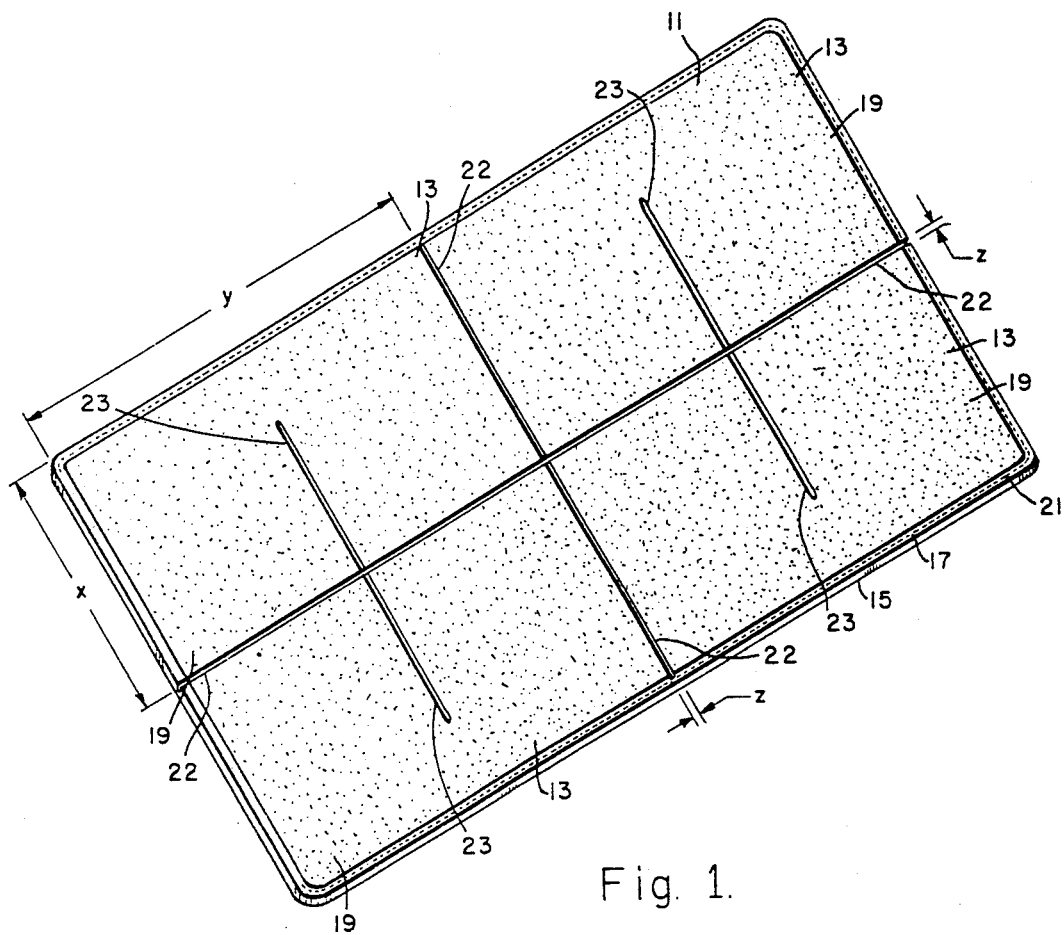
FIG. 1 is a top perspective view of a surgical floor mat embodying the present invention, with certain dimensions designated as "x", "y", and "z"

As shown in the drawings wherein like numerals relate to like elements throughout, the invention is embodied in a surgical floor mat 11 comprising four compressed sponge sections 13 and a waterproof and foldable sheet 15. The compressed sponge sections 13 are adhered to the foldable sheet 15 by way of glue (not shown) or some other means commonly known in the art of securement. Edges 17 of the foldable sheet overlap top surfaces 19 of the compressed sponge sections 13 by approximately ⅜th of an inch.

Edges 17 of the foldable sheet 15 are stitched or glued to the top surface 19 of the compressed sponge sections 13. Alternatively, as shown in FIG. 1 stitches 21 at about ⅜th of an inch inwardly ensure that the edges 17 of the foldable sheet 15 are properly adhered to the top surface 19 of the sponge sections 13. The glue (not shown) also has a tendency to seal any holes which might be created by the stitches 21.

Figure 2:
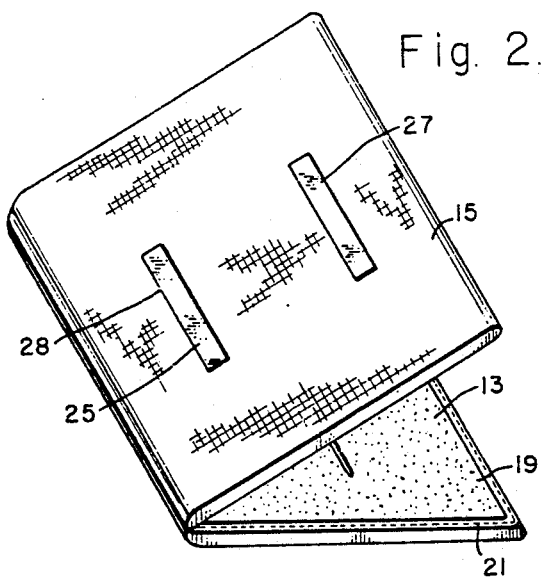
FIG. 2 is a top perspective view of the surgical floor mat in a partially folded condition.
Figure 3:
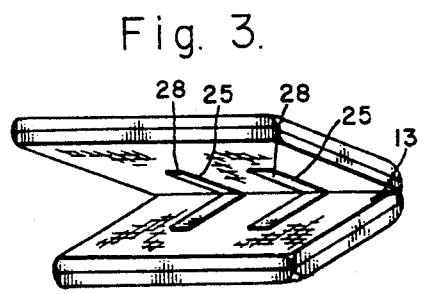
FIG. 3 is a top perspective view of the surgical floor mat in a further folded condition then that shown in FIG. 2.

Between each of the sponge sections 13 is a flow canal 22 having a dimension shown as "z" in FIG. 1. The "z" dimension is approximately 2 to 4 millimeters and of sufficient width to allow fluids to readily flow between each of the sponge sections 13, and also allow the sponge sections 13 to fold relative to each other. The sponge sections 13 are sufficiently spaced apart from one another so that the embodiment of the surgical floor mat 11 as shown in FIG. 1 can be folded once as shown in FIG. 2, and then a second time as shown in FIG. 3. Any fluid which has been absorbed by the compressed sponge sections 13 can be trapped within the surgical floor mat 11 as shown in FIG. 3. The waterproof and foldable sheet 15 provides a sufficient barrier to the migration of moisture from the compressed sponge sections 13.

Additionally, other flow canals 23 can be incorporated in the sponge sections 13 to provide for greater foldability, or at least partially foldability, and allow higher concentrations of fluid or moisture to migrate to drier or other parts of the compressed sponge sections 13. These other flow canals 23 are similarly 2 to 4 millimeters in width and can be anywhere between 4 to 6 inches in length. These other canals 23 can be formed by stitching the compressed sponge sections to the foldable sheet along a 4 to 6 inch length to create an indentation.

As shown in FIG. 1, the surgical floor mat 11 is comprised of four of the compressed sponge sections 13 each having a "y" length and an "x" width. The "x" and "y" dimensions can vary for each of the compressed sponge sections 13, as well as the number of compressed sponge sections 13 can be increased or decreased with some effect on foldability and absorption rates.

As shown in FIG. 2 adhesive strips 25 can be glued or otherwise fastened to an undersurface 27 of the foldable sheet 15. The adhesive strips 25 may have a top peel 28 which can be easily pulled off the adhesive strip 25 to expose a sticky or adhesive surface (not shown) so that the surgical floor mat 11 can be more securely positioned on an operating floor. Alternatively, the adhesive strips 25 may not be utilized and the peel 27 may remain intact so that the surgical floor mat 11 can be readily moved about the operating floor depending upon the particular needs of the operation.

Figure 4:
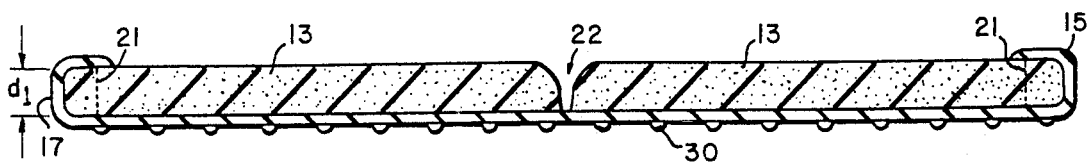
FIG. 4 is a cross-sectional view of the surgical floor mat shown in FIG. 1 in a dry condition.
Figure 5:
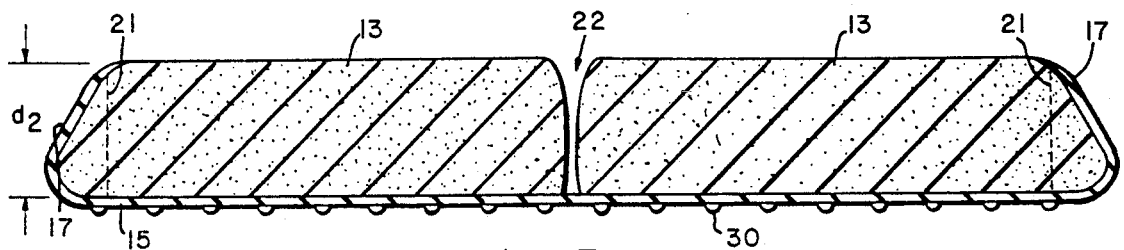
FIG. 5 is a surgical floor mat as shown in FIGS. 1 and 4 in a wet condition.

As shown in FIG. 4 the compressed sponge sections in a dry condition have a thickness $d_1$ which optimumly ranges between 1 and 2 millimeters in thickness. When the compressed sponge sections are in a wet condition as shown in FIG. 5, the thickness as shown as $d_2$ can be of the order of 15 to 25 millimeters, and thereby retain a substantial amount of fluid. Also, the edges 17 of the sheet 15 tend to stand more erect and help retain any fluids within the compressed sponge sections 13.

The highly absorbent quality of the compressed sponge sections 13 is due to the compressed cellulose, cloth fiber and salt constituents which are formed by compressing and drying a liquefied composition of those materials so as to be compact and have a low profile in a dry condition, yet absorb a substantial amount of water for fluids when in contact with water or fluid. This type of material is known in the sponge art and typically incorporates wood pulp, cotton, flax, rayon, hemp, with polyol and sodium chloride. This composition is biodegradable and highly absorptive.

For an example of its absorptive qualities, a surgical floor mat having compressed sponge sections 13 having a volume of 357 cubic inches when dry can expand to approximately 714 cubic inches when wet. In this example, the compressed sponge sections 13 can absorb approximately 6 liters of fluid, and retain that fluid in such a way as to be easily carried away and deposed of.

As shown in FIGS. 4 and 5, stippling 30 can be included on the undersurface 27 of the foldable sheet 15. This stippling 30 provides better traction between the undersurface 27 and the foldable sheet 15 and the floor (not shown) during use of the surgical mat 11 during the course of an operation.

Such stippling 30 can be made of an elastomeric material which is silk screened onto the undersurface 27 of the foldable sheet 15. Alternatively, stippling 30 may not be necessary, provided the material used for the foldable sheet 15 is sufficiently gummy or sticky or has a coefficient of friction which would prevent the surgical floor mat 11 from slipping when placed upon the floor.

It should be pointed out that the foldable sheet can be comprised of polypropylene, polyethylene, an elastomeric material or some other material which is sufficiently flexible and moisture impervious in accordance with the present invention.

The optimum sizes for the embodiment of the invention according to FIG. 1 are 24 inches by 36 inches by 2mm ranging to 12 inches by 18 inches × 9mm. Also, another size is 36 inches by 36 inches by 2mm ranging to 12 inches by 36 inches by 7mm.

Figure 6:
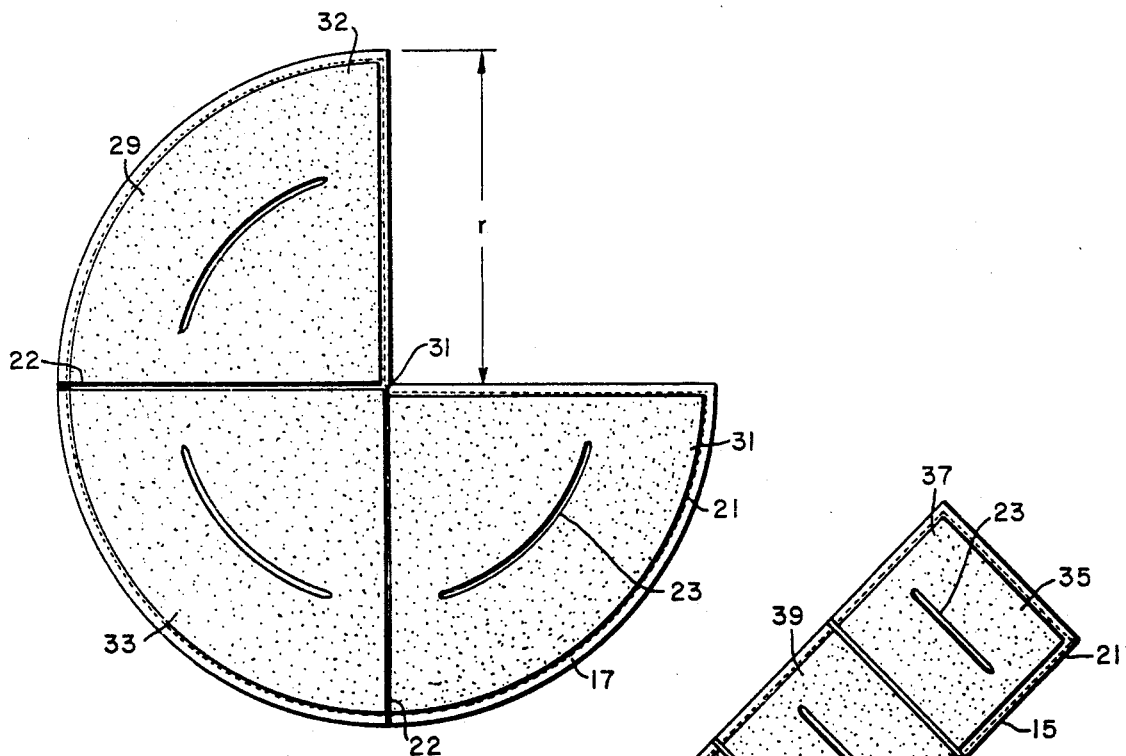
FIG. 6 is a top plan view of a further embodiment of the surgical floor mat of the present invention with a dimension indicated as "r"

In FIG. 6 a second embodiment of the present invention indicated as numeral 29 is round. Its radius or "r" is 24 inches in its optimum dimension for many surgical uses. Many of the elements in the this embodiment except for the shape and foldability aspects of the second embodiment 29 are similar to the first embodiment as shown in FIGS. 1-5. However, the additional flow canals 23 are in a locus of points about a radii from a center 31 of the surgical floor mat 29. Either prior to use when the surgical floor mat 29 is in storage or subsequent to use when the surgical floor mat 29 is to be discarded, sections 31 or 32 can be folded onto section 33 and the remaining section can be folded onto the two sections so folded. Again, any absorbed moisture can be trapped sufficiently by the foldable and moisture impervious sheet 15 so as to easily transport the absorbed fluid to its disposal.

Figure 7:
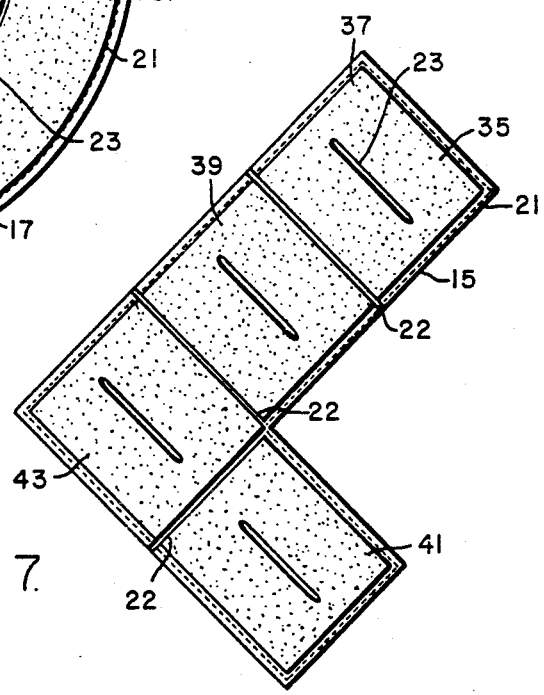
FIG. 7 is top plan view of a third embodiment of the surgical floor mat of the present invention.

Finally, a third embodiment is shown in FIG. 7 as numeral 35. A section 37 can be folded over onto a section 39 and a section 41 can be folded onto a section 43. Then, sections 37 and 39 can be folded onto sections 41 and 43. Again, the absorbed fluid resulting from an operation can be easily and quickly transported to its disposal, minimizing leakage and allow expeditiously clean-up after surgery.

For all the embodiments, the compressed sponge sections 13 can be of light blue color while the foldable sheets can be of a darker blue color or transparent or translucent so as not to be a distraction over the course of surgery in the event that operating surgeons are looking downwardly during their operation. It should be also be noted that all of the features and attributes as described for the first embodiment 11 of the invention are equally applicable to the second embodiment 29 and the third embodiment 35 of the invention.

It should be appreciated that from the foregoing description that the present invention provides an improved disposal surgical floor mat which is simply to use, and simple in construction. It is easily foldable prior to its use and is easily foldable after its use to carry away surgical fluids in a sanitary manner. The surgical mat of the present invention is inexpensive to manufacture, is easily stored, is easily disposed of, and is optionally movable once positioned on the floor or can be more securely held to the floor to prevent persons in the surgery room from tripping. The surgical floor mat's low profile in a dry condition further reduces the chances of accident by tripping. The surgical floor mat expanded in a wet condition allows for a substantial degree of water absorption necessary over the course of the many operations such as arthroscopic knee surgery.

The surgical mat of the invention by its composition and construction resists tearing and allows a stool or chair with rollers to easily roll over the surgical mat without jeopardizing the integrity of the surgical mat.

Although the present invention has been described in detail with reference only to the presently preferred embodiments, it will be appreciated by those of ordinary skill in the art that various modifications can be made without departing from the invention. Accordingly, the invention is limited only by the following claims.

I claim:

1. A surgical floor mat comprising:
   (a) a plurality of compressed sponge sections each having a low profile and being generally compact allowing a chair or stool with rollers to easily roll over said sections, and wherein said compressed sponge sections are sized and arranged so as to easily fold onto one another in a dry condition, and having an expanded profile in a wet condition for absorbing fluids which fall onto said plurality of compressed sponge sections over the course of a surgical procedure; and
   (b) a waterproof and foldable sheet having a top surface dimensioned to hold said sponge sections, wherein said sponge sections are adhered to said foldable sheets in side-by-side relationships allowing said sponge sections to be folded on top of each other; and wherein said foldable sheet having a non-slip bottom surface, whereby said surgical floor mat can be kept in a folded condition prior to surgical use, unfolded and placed on a floor in a safe condition for surgery, so as to be easily rolled over or walked over, and later refolded and discarded with any of the surgical fluid absorbed over the course of the operation trapped within said folded surgical floor mat.

2. A surgical floor mat as claimed in claim 1, wherein said plurality of compressed sponge sections having a composition of cellulose, cloth fiber, and salt and having a dry profile ranging between 1 and 2 millimeters in thickness.

3. A surgical floor mat as claimed in claim 2, wherein said plurality of compressed sponge sections are separate and apart from each other by a distance of between 2 and 4 millimeters, thereby allowing foldability of said surgical floor mat.

4. A surgical floor mat as claimed in claim 3, wherein said non-slip bottom surface of said foldable sheet having an adhesive strip which can be adhered to a floor during use.

5. A surgical floor mat as claimed in claim 4, wherein said non-slip bottom surface of said foldable sheet having stippling for engagement between the floor and said surgical mat to provide engagement therebetween and a high coefficient of friction.

6. A surgical floor mat as claimed in claim 5, further comprising additional drainage canals interrupting each of said plurality of compressed sections to allow transport of surgical fluid throughout said compressed sponge sections.

7. A surgical floor mat as claimed in claim 6, wherein said surgical floor mat has a rectilinear shape and having a structure which can be folded at least twice for a more compact arrangement.

8. A surgical floor mat as claimed in claim 6, wherein said surgical floor mat has an L-shape and a structure which can be folded at least twice to provide a more compact arrangement.

9. A surgical floor mat as claimed in claim 6, wherein said surgical floor mat has a circular configuration absent a missing quartile and having three sections, each section being foldable with another section and making for a more compact arrangement.

10. A surgical floor mat comprising compressed generally compact sponge sections of cellulose, cloth fiber, and salt having a profile of approximately 1 to 2 millimeters in a dry condition and a 15 to 25 millimeters cross-sections in a wet condition, wherein said sponge sections are arranged so as to have a gap between each of said sponge sections in a side-by-side relationship, and wherein said surgical floor mat has a foldable plastic sheet, wherein said sponge sections are adhered to said foldable sheet, wherein said foldable sheet has a non-slip undersurface engagement with a floor, and wherein said foldable sheet allows said sponge sections to be folded over onto each other to provide a more compact structure for purposes of initial storage or later disposal, wherein said sponge sections are of a size, configuration and spaced relationship allowing said sponge sections to be folded over onto themselves in a dry condition, said sponge sections being sufficiently compact allowing a chair or stool with rollers to easily roll over said sponge sections.

11. A surgical floor mat as claimed in claim 10 having an L-shape and a structure foldable at least twice.

12. A surgical floor mat having fluid dispersion canals interrupting said sponges sections.

13. A surgical floor mat as claimed in claim 12 further comprising adhesive strips attached to said undersurface of said foldable sheet for adhering said surgical floor mat to the floor.

* * * * *